United States Patent [19] [11] 4,124,777
Mori et al. [45] Nov. 7, 1978

[54] SIGNAL EXCHANGE SYSTEM IN AN INTEGRATED SERVICES DIGITAL NETWORK

[75] Inventors: Hiromichi Mori, Kawasaki; Yoshikazu Ikeda, Tama, both of Japan

[73] Assignee: Kokusai Denshin Denwa Co., Ltd., Tokyo, Japan

[21] Appl. No.: 826,963

[22] Filed: Aug. 22, 1977

[30] Foreign Application Priority Data

Aug. 24, 1976 [JP] Japan .................................. 51-100149

[51] Int. Cl.² .............................................. H04J 3/16
[52] U.S. Cl. ........................... 179/15 AS; 179/15 BW
[58] Field of Search ........ 179/15 AS, 15 BW, 15 AT

[56] References Cited

U.S. PATENT DOCUMENTS

| 3,424,869 | 1/1969 | Anderson et al. | 179/15 AS X |
| 3,510,596 | 5/1970 | Lyghounis | 179/15 AS |
| 3,997,729 | 12/1976 | Costales et al. | 179/15 AS |
| 4,002,841 | 1/1977 | Ching et al. | 179/15 AS |
| 4,066,844 | 1/1978 | Ridings, Jr. et al. | 179/15 BW |

OTHER PUBLICATIONS

"Engineering Aspects of TASI," K. Bullington et al., Bell System Technical Journal, vol. 38, No. 2, Mar. 1959, pp. 353-364.
"Analysis of Asynchronous Time Multiplexing of Speech Sources," T. G. Birdsall et al., IRE Trans. on Comm. Systems, Dec. 1962, pp. 390-397.
"On Distributed Communications Networks," P. Baran, IEEE Trans. on Comm. Systems, vol. 12, No. 1, 1964.

Primary Examiner—Thomas W. Brown
Attorney, Agent, or Firm—Armstrong, Nikaido, Marmelstein & Kubovcik

[57] ABSTRACT

In a transmission station, the information from each channel is sampled and encoded to a PCM form having a predetermined length of bits. The group of said bits together with line number bits is called a signal block. Only significant signal blocks from all the channels are transmitted to a receiving station through a buffer memory provided at a transmission station and a common transmission line. The receiving station receives the signal blocks through a buffer memory provided at the receiving station and inserts an idle signal to the portion where the transmission station removes a signal block due to an insignificant signal block. The received signal blocks are distributed to each receiving channel, thus, the original signal is reproduced at the receiving station.

6 Claims, 8 Drawing Figures

SIGNAL EXCHANGE SYSTEM IN AN INTEGRATED SERVICES DIGITAL NETWORK

BACKGROUND OF THE INVENTION

The present invention is related to communication exchange systems in general and is particularly connected with the communication exchange system in a general digital integrated network.

So far, telegraphic type and telephone type of exchange systems have been studied and developed independently of each other.

Telegraphic type exchange systems may be mainly classified into circuit exchange system and store-and-forward exchanger systems. A packet exchange system stands between the two.

The circuit exchange system is appropriate for conversational type of communications but utilization of the transmission line is very inefficient.

The store-and-forward exchange system is efficient in terms of line utilization but is not appropriate for conversational communication.

A packet exchange system is, in principle, a type of a store-and-forward exchange system by which data is transmitted in a unit called a packet. This system maintains utilization efficiency of the line and is also applicable to conversational communication if a certain extent of time lag is tolerated. This, of couse, is referring to a conversational communication in the telegraphic system and not the conversational communication in the telephone system.

On the other hand, the telephone type of exchange system has been employing a system which is very similar to the circuit exchange system mentioned above, supported by the absolute necessity of securing conversational type of communications. Therefore, utilization rate of the line is very poor.

Introduction of multiplex communication into the transmission line in order to improve the line utilization rate and the TASI (Time Assignment Speech Interpolation) aiming at increased utilization rate of communications between two points taking advantage of redundancy of conversation are known so far. However, efforts to secure conversational type of communication while at the same time to attempt to improve utilization rate of the line through integration of both the transmission line and the exchange have not been made.

SUMMARY OF THE INVENTION

Therefore, this invention improves the conventional technology and solves the above described problems. The objective is to present a communication exchange system through integration of the transmission line and the exchange that is applicable to both telegraph and telephone, that has a high utilization rate of the line as in store-and-forward exchange, and may be applicable to conversational type of communication in the same manner as the conventional telephone exchange system.

Characteristic of this communication exchange system resulting from this invention is that it has been made applicable to telephone and telegraph with a concept similar to packet exchange system used in the conventional telegraphic communication.

According to this invention, utilization rate of the line is essentially high. In order to secure conversational communication in its strict sense as required in telephone communication, a common buffer memory of equal capacity is installed both on the transmitting side and the receiving side. In order to further improve the utilization rate of the line, even when the line is engaged, transmission through that particular line is not made during the pause of conversation.

Switching in the conventional exchange is effected with generation of a call but in the exchange produced by this invention, switching is done by generation of a voice.

BRIEF DESCRIPTION OF THE DRAWINGS

The foregoing and other objects, features, and attendant advantages of the present invention will be appreciated as the same become better understood by means of the following description and the accompanying drawings wherein.

DESCRIPTION OF THE PREFERRED EMBODIMENTS

Figure 1:
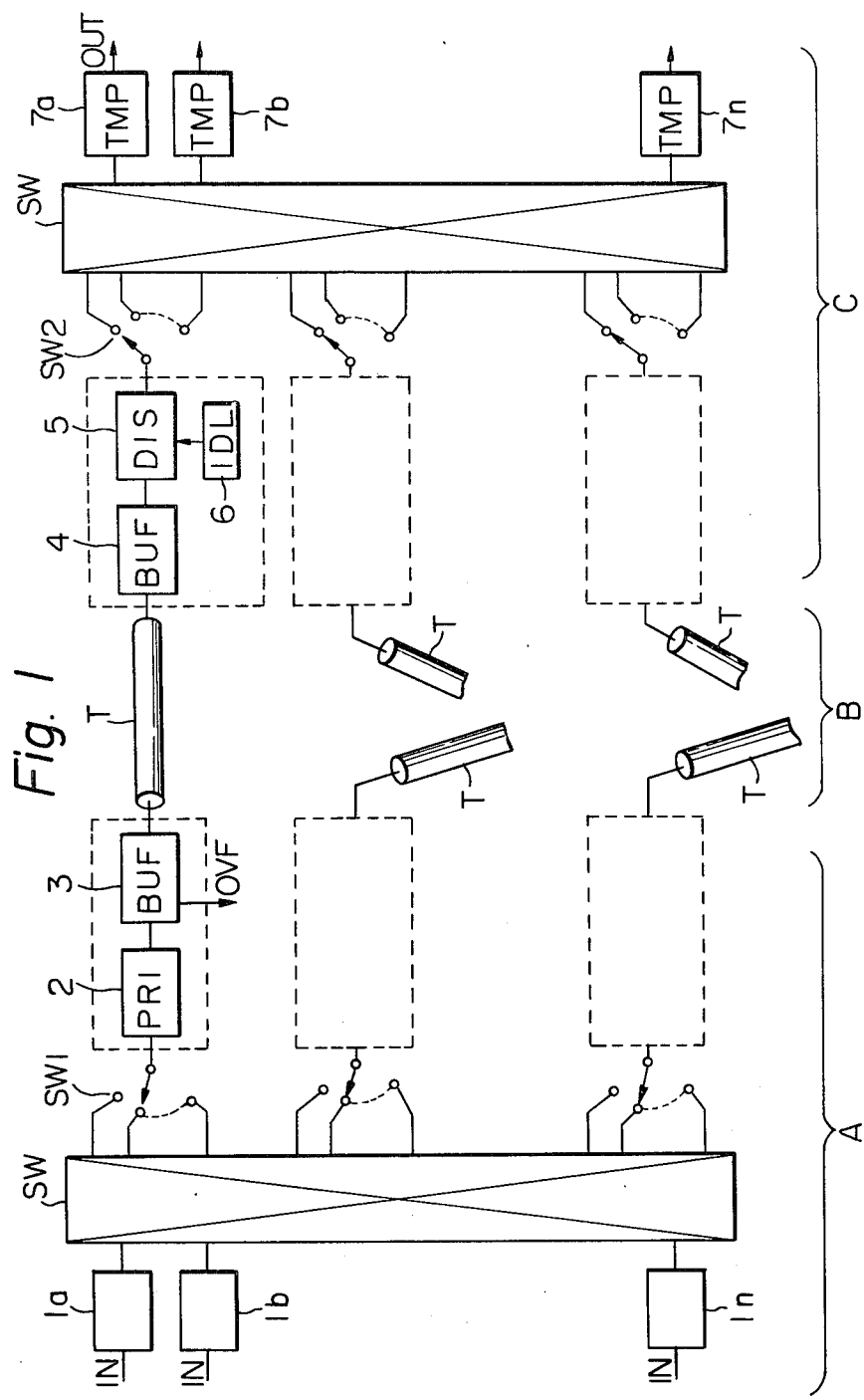
FIG. 1 is a block diagram of the communication exchange system under this invention.

FIG. 1 shows a block diagram of the basic framework of the communication exchange system according to the present invention. The newly invented system comprises the transmitting side A, the transmission line B, and the receiving side C. In the case of mutual communications, transmissions are carried out in both directions. Since the organization of each direction may be symmetiric for the sake of convenience, description is made based on the framework in FIG. 1.

Input signal from each communication line is applied to this system in the form of PCM signal. In this operational example, a plurality of lines (IN) are assumed to be receiving input. The signals from each line are temporarily stored in temporary memory $1a, \ldots, 1n$, and are composed at this stage into data units ($d$) having a given number of bits which constitute a signal block.

In the case of telephone line, for example, appropriate size of data unit ($d$) may be about 512 bits.

The data output from the temporary memory $1a, 1b, \ldots, 1n$ of each line is scanned by the first scanning device $SW_1$ via the exchange circuit SW. The data from each line is arranged on a single line on the time axis in the order of the lines.

As indicated in the drawing, several sets of the first scanner $SW_1$, the priority decision circuit (PRI2; to be described later) and the first common buffer memory (BUF) 3 are installed for each line.

Figure 2:
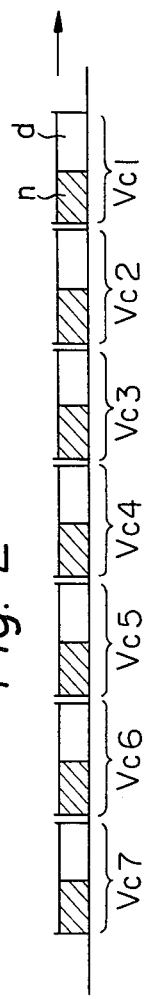
FIG. 2 is an arrangement of envelopes

The output from the first scanner ($SW_1$) is applied to the priority decision circuit (PRI) 2 and contents of the data is decided whether the same are significant or not at this stage and the order of priority is imparted. The standby line and the pause of voice are ranked at the lowest order of priority and the data of those lines are removed in principle. The line number on the input side of $SW_1$ is imparted to significant data. This line is to be called "virtual circuit" (VC) hereafter. The combination of the VC number N and the data unit ($d$) mentioned above is called a signal block. Signal blocks are applied to the first buffer memory (BUF) 3. In the memory (BUF) 3, the signal blocks form a queue as shown in FIG. 2. The capacity of the memory (BUF) 3 is decided in accordance with the traffic analysis. Some signal blocks overflow with a probability of negligible quantity and disappear. If the probability of disappearance is small it affects the quality of the voice in telephone conversation very little.

Through the priority decision circuit (PRI) 2, the stand-by lines and the lines during pauses between voices are removed. Therefore, in the queue in the buffer memory (BUF) 3, the removed lines are as if they have been dropped out. Thus, the VC numbers are not necessarily sent consecutively. At the same time, the transmission capacity M on the transmitting side of the exchange is smaller than the number N of the VC (M<N). Further, the required capacity of trunks can be only about ⅓ of the capacity of the trunks of the conventional system as done by the conventional TASI. This may be interpreted that there exist nominally N output trunk lines.

In this invention, the exchange system can been made as a "blackbox," a virtual circuit has been installed by which only necessary information is transmitted. Therefore, the system developed by this invention may be called a VC exchange system.

The output from the first buffer memory (BUF) 3 is sent out to the transmission line T. The transmission line T can be either wire or wireless, of course.

At the receiving point, the received signal blocks are first stored in the second buffer memory (BUF) 4. The capacity of the second buffer memory (BUF) 4 shall be equal to that of the first buffer memory (BUF) 3 or greater. The distribution circuit (DIS) 5 distributes via the second scanner $SW_2$ in accordance with the VC number of the envelopes. At this time, the idler 6 shall supply idle signals to the VC lines to compensate for the dropped signal blocks.

The output of the second scanner $SW_2$ is applied to each line in the form of PCM signal via the exchange SW and via the temporary memories $7a, \ldots, 7n$ for each line.

In case this system is applied to telephone lines, the time sequence of telephone conversation is correctly transmitted. Therefore, description on security of time transparency follows: Time transparency is secured through synchronized switching of the first and second scanners in the order of the VC numbers, and also through the buffer memories 3 and 4 installed at the transmitting and receiving points. In FIG. 1, at the receiving point, the envelopes arrive in the order of the VC numbers, but there are signal blocks that drop off at the time of sending, and idle signals are given to the receiving point to fill the vacancy.

Figure 3:
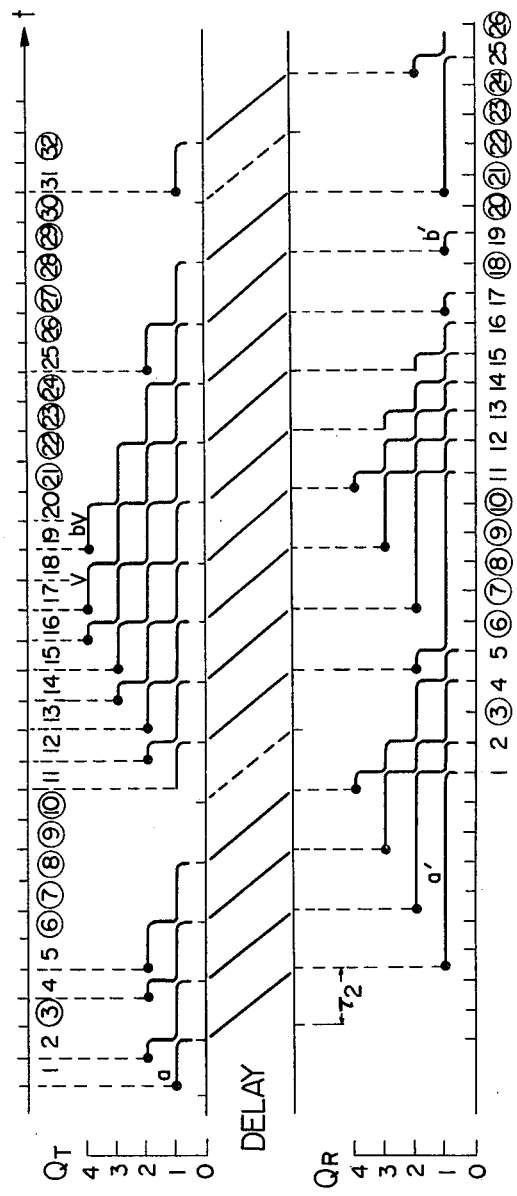
FIG. 3 is a performance time chart

At the moment of scanning the particular VC line which is scanned by the second scanner $SW_2$, if the signal block of that line does not reach the scanner $SW_2$, an idle signal shall be inserted instead of the signal block. This is the generation of the so-called "underflow." However, this "underflow" does not occur in this invention because: the buffer memory (BUF) 4 is installed at the receiving point; the sum of the waiting time in the first buffer memory (BUF) 3, and that in the second buffer memory (BUF) 4 is so controlled that it will become equal for each signal block. FIG. 3 illustrates this. In FIG. 3, capacities of both the first and the second buffer memories are assumed to be equivalent to 4 signal blocks. The first signal block 1 is to be placed at the first position ($a$) in the first buffer memory (BUF) 3, delayed by the propagation delay of transmission line (DELAY), and inserted into the second buffer memory 4 ($a'$). At this time, the second buffer memory 4 outputs the signal block 1 after having ($a'$) wait for the duration that the said buffer memory becomes full (the duration = [emission time of transmission; $\tau_2$] × [(capacity of the buffer memory) − 1]).

On the other hand, signal block 19, for example, must wait 4 times as shown in the drawing as queue ($b$) in the first buffer memory 3. Therefore, in the second buffer memory 4, the queue ($b'$) is immediately output. From the above description and from FIG. 3, it is obvious that the signal blocks at the sending point are regenerated at the receiving point in the correct time sequence.

In FIG. 3, the signal block with the circle mark is to be dropped off in the priority decision circuit at the sending point and in its place an idle signal is inserted at the receiving point. The signal block with the mark V is overflowed in the buffer memory at the sending (transmitting) point, and in its place an idle signal is inserted at the receiving point.

Figure 4:
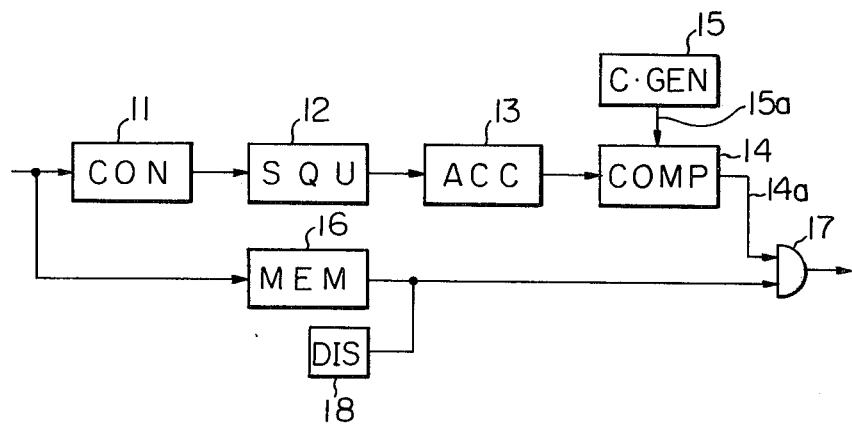
FIG. 4 is a block diagram of priority decision circuit

The priority decision circuit consists of, for example, as shown in FIG. 4, the compounding signal converting circuit 11, the square circuit 12, accumulator 13, the comparator 14, the fixed code generating circuit 15, the memory circuit 16, the gate 17, and the line number display circuit 18.

PCM signals from each input channel are input one after another into the compounding signal converting circuit 11 from the temporary storage circuit $1a, \ldots, 1n$ via the first scanner $SW_1$.

Usually, in order to secure good quality for a broad dynamic range of signals, compounding code is used for the PCM code for transmitting, and non-linear operation is performed in the encoding process of PCM. At the compounding code converting circuit 11, the compounding code of PCM is converted into linear code. The square of this output is calculated through the square circuit 12. The squared signal value represents the power value of the signal. The accumulator 13 accumulates the output from 12 one after another When accumulation of the PCM code from the same channel has been completed, the result is output to the comparator 14. Then the accumulator is reset to zero ready for the next operation.

At the comparator 14, a spectrum of the signal power value accumulated in the accumulator 13 is classified into several categories and determined. For example, from the output of 13, the top 10 digits are drawn, ignoring the rest, indicating by binary code making the maximum value "1111111111." With this value as reference, the level 30dB below this reference level is made threshold level. This threshold level shown in binary code is "0000000001." This code is generated at the fixed code generating circuit 15 and output from the output lead 15a and compared with the signal power at 14. If the signal power is greater than −30dB, "1" is output to the output lead 14a and the gate 17 opens. If the signal power is smaller than −30dB the gate 17 does not open. The square circuit 12, the accumulator 13, the comparator 14, the fixed code generating circuit 15, the gate 17 can be readily arranged through digital logic circuit element since these are well-known technology. These given, with the −30dB as the border, the signal power level can be classified into two different categories and determined.

On the other hand, the PCM code of each channel input into the priority decision circuit is being stored one after another in the memory circuit 16 consisting of the shift resistors; when the gate 17 opens the stored signal with the line number from the line number display circuit 18 is transferred as one package to the first common buffer memory 3. If the signal power is less than −30dB and the gate 17 does not open, new PCM codes are input into the memory circuit 16 and the old codes are dropped out.

Figure 5:
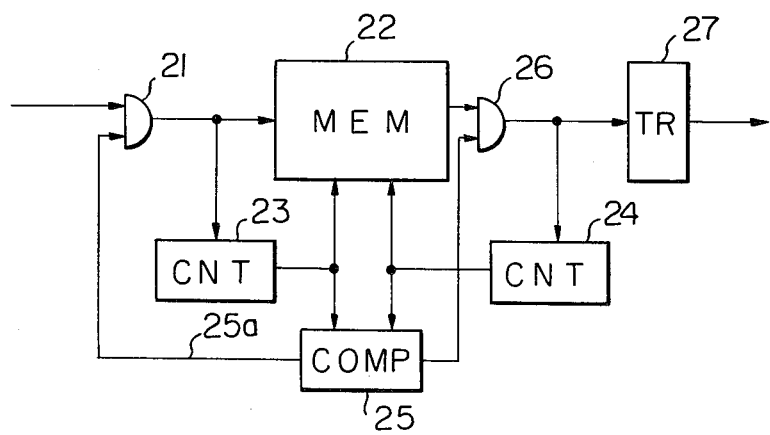
FIG. 5 is a block diagram of first common buffer memory

The first common buffer memory is an elastic storage circuit. It consists of, as, for example, shown in FIG. 5, the gates 21 and 26, the random access memory 22, the write address counter 23, the read out address counter 24, the comparator 25, and the transmission terminal equipment 27. Initially, since the input 25a on one side of the gate 21 is set at "1," the gate 21 is open, and the output signal from the priority decision circuit 2 mentioned earlier passes through the gate 21. The random access memory 22 has a capacity of, say, 16 accumulation units, one accumulation unit being bits required for storage of signals consisting of line number and PCM codes which are output from the priority decision circuit 2 mentioned earlier. Both the write address counter 23 and the read out address counter 24 indicate the data storage place (address) within the random access memory, and are capable of counting the same value as the number of units stored. For example, if the memory capacity has capacity for 16 stored units, it continues adding 1 from 0 to 15 and returns to 0 again. This is an arithmetic of modulo 16; and additions and comparisons of the counters, hereafter, will follow this arithmetic.

The 64 units of PCM code (512 bits) and the line number, after passing through the gate 21 as one bundle, are stored in random access memory 22 following the address indicated by write address counter 23, and at the same time have 1 added to the contents of the write address counter 23.

On the other hand, what was stored in the random access memory 22 is read out one after another following the address indicated by the address counter 24 is sent out to the transmission line via the transmission terminal equipment 27. Simultaneously, each time the contents of one word are read out the contents of the read out address counter 24 increases by 1. Provided, if the contents of 23 and 24 are to be called $W_1$ and $R_1$ respectively, and if $W_1 = R_1$, then the gate 26 is closed and the reading is not done. Supposing $W_1 = R_1 - 1$, the gate 21 closes and writing is not done. The comparison between $W_1$ and $R_1$ is done by the comparator circuit 25 which is readily arranged with logic circuit elements. The difference between $W_1$ and $R_1$ is the number of signals waiting from transmission. $W_1 = R_1$ indicates that the buffer is empty, while $W_1 = R_1 - 1$ indicates that it is full. Any signal attempting to enter this transmitting buffer under the full condition overflows and disappears because the gate 21 is closed.

The transmission terminal equipment 27 converts the signal into a form appropriate for the transmission line and is publicly known as a transmitting equipment of digital signals.

Figure 6:
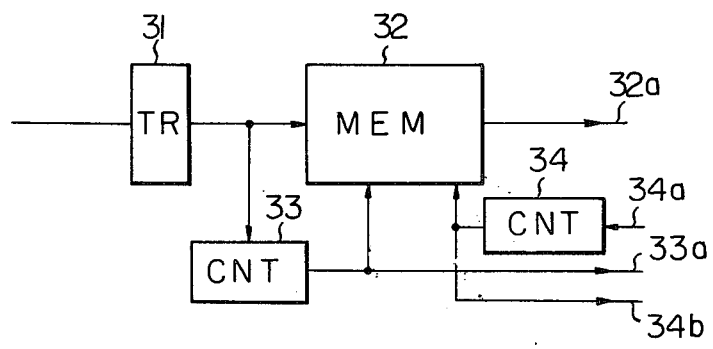
FIG. 6 is a block diagram of second common buffer memory

The second common buffer 4 is an elastic storage circuit. It consists of, as shown in FIG. 6, for example, a terminal equipment 31, random access memory 32, write address counter 33, read out address counter 34. The terminal equipment 31 is a device that receives the signal wave sent through the transmission line and can be arranged by well-known technology.

The random access memory 32 and both the address counters 33 and 34 are arranged in the same way as the random access memory 22, the write and read out address counters 23 and 24 of the first common buffer memory 3.

The received signals, passing through the terminal equipment 31, have the write address counter 33 proceed, and are stored in the corresponding address of the random access memory 32, one storage unit after another (64 PCM signals and the line number being one storage unit).

On the other hand, the contents of the random access memory 32 are read out one after another according to the address indicated by the read out address counter 34 and are then sent to the distributing circuit 5.

The indication to proceed provided by the counter 34 is given by the distributing circuit 5. For this indication to proceed, the contents of both the counters 33 and 34 are also sent to the distributing circuit.

Figure 7:
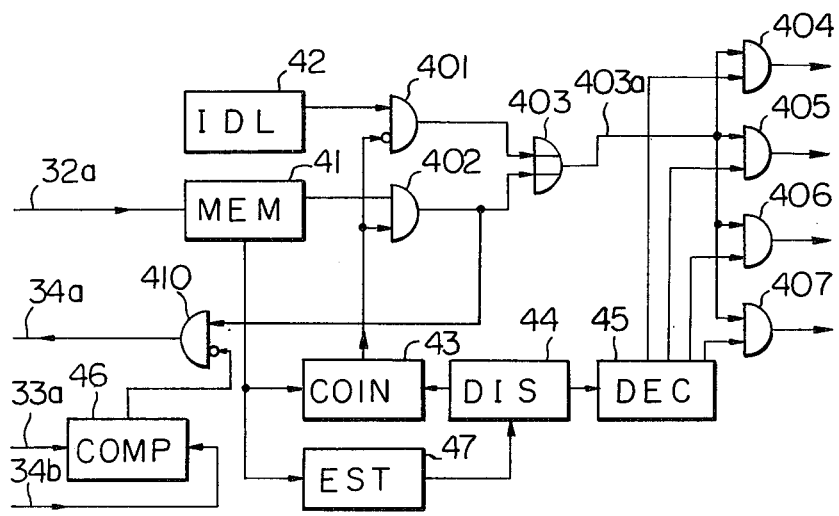
FIG. 7 is a block diagram of distribution circuit

The distributing circuit 5 consists of, for example, as shown in FIG. 7, the memory for one word 41, the idle signal generating circuit 42, the coincidence detecting circuit 43, the distribution counter 44, the decoder 45, comparator 46, initial set circuit 47, the various types of gates 401–410.

The signal input into the distributing circuit 5 via the 32a is first stored in the memory 41. The portion in this signal indicating the line number has a prescribed bit position. This portion only can be drawn and checked at the coincidence circuit 43 to see if it coincides with the contents of the distribution counter 44. If it coincides, the gate 402 opens. The distribution counter 44 provides cyclic indication to include all the line numbers of the senders with the same cycle as the first scanning equipment $SW_1$ of the senders. The contents of the distribution counter 44 are de-coded by the decoder 45. Distribution is done by opening the gates 404–407 one after another that correspond to each individual line. In this example, the drawing shows the case of four lines. Therefore, the signals stored in the memory 41 passing through the gares 402 and 403, are distributed to the corresponding lines, and, at the same time, have the read out counter 34 of the receiving buffer proceed via the lead 34a, and input new signals into the memory 41.

At the time of sending, each line is scanned cyclically, one after another. Therefore, in principle, the line numbers receive signals cyclically without a pause. As mentioned earlier, however, some signals are dropped out at the priority decision circuit 2 and the first common buffer memory 3, and thus, some numbers are skipped. If some numbers are skipped, the line number V of the memory 41 and the contents N of the distribution counter 44 do not coincide, and V becomes greater than N. When this occurs, the coincidence circuit 43 makes no output, the gate 402 closes, while the gate 401 opens. The idle signal generating circuit 42 is connected to the gate 401, and in that circuit the telephone signal with silent or signals that correspond to idle of data (for example the code with all zero) are generated. Therefore, these signals are distributed to the lines indicated by the distribution counter 44.

Figure 8:
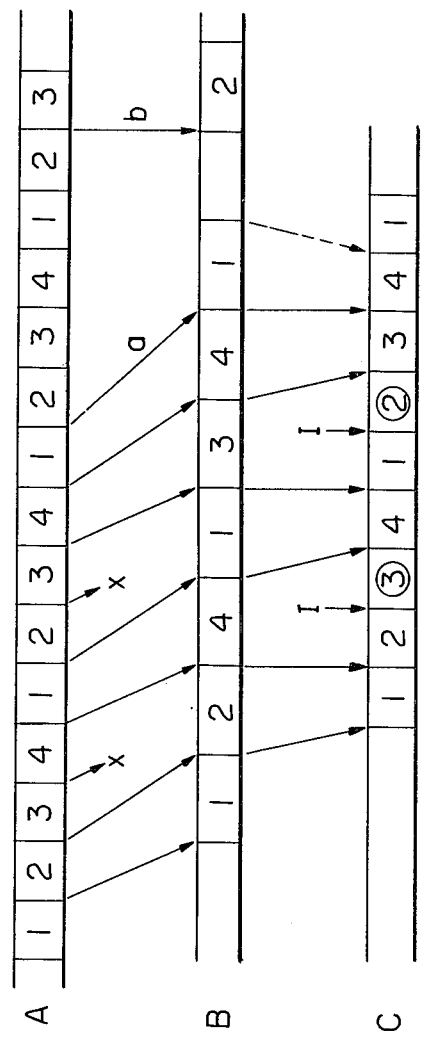
FIG. 8 is a time chart showing distribution time of signals.

FIG. 8 is a time chart showing distribution time of signals. A is the order of the sender's scanning. B indicates the order of signals on the transmission line. C shows the order of the distribution on the receiving side. The figures are line numbers.

In this drawing, delay in the transmission resulting from propagation being constant, is omitted. Some of A's signals disappear as shown with X mark due to the priority decision circuit 2 or the overflow in the first common buffer memory 3. The time lag of A and B results from the queuing at the sender's buffer. B shows the time for input of signals into the second common buffer memory 4. The time lag between B and C corresponds to the time of signals staying at the second common buffer memory 4 and the memory 41 prior to distribution.

At C, the signals which the line numbers skipped are replaced by idle signals (I mark) as described earlier and fit in the positions of the figures surrounded by circle o. Therefore, at C, the time relationship of the sender's order A is recovered. However, as shown with (a), if the signals must wait for a long time at the first common buffer, the time of distribution from B to C is reversed as shown by the dotted line, and distribution becomes impossible. This is to be called underflow of the second common buffer. In order to avoid this, C as a whole should be delayed beforehand. Since the maximum value of time differential between A and B is determined by the capacity of the transmitting buffer (corresponding to the maximum queuing time), underflow does not occur if the time differential between A and C is made the same as this value.

On the other hand, there can be signals (such as (b) in the drawing) from A to B that do not wait at all. Therefore, it is necessary for the second common buffer to adjust this time variance, and the minimum limit of capacity required for the second common buffer is equal to the capacity of the transmitting buffer.

It is obvious from the above description that it is necessary for the distribution counter 44 on the receiving side to have a certain time differential with the scanning cycle on the transmitting side. This differential is imparted by the initial set circuit 47.

That is, the transmitting line is vacant, then initial signal is input into the memory 41. It is obvious that this signal is not queuing at the transmitting buffer. Therefore, the distribution counter 44 is forcedly set at the number which is the line number of the above signal less the value of the capacity of the transmitting buffer.

By doing this, the signals stored in the memory 41 stay in the memory 41 in the same amount as the capacity of the transmitting buffer. Thereafter, the distribution counter 44 operates with this time differential.

Further, if it is preferred to make this synchronized operation more reliable, a special form of signal for synchronizing purpose is transmitted at a given interval, and the numbers of envelopes queuing at that moment at the transmitting buffer are passed to the distribution circuit. By deducting this data from the maximum queuing time, the time differential of the distribution counter 44 can be readily established.

The comparator 46 is installed in order to prevent the read out address counter 34 from proceeding idly in spite of the receiving signals not being stored in the receiving buffer.

That is, when the contents of the write address counter 33 and the read out address counter 34 of the receiving buffer coincide, no signals are stored in the random access memory 32. Therefore, coincidence of the contents of the counters 33 and the 34 should be detected by the comparator 46. When they coincide the gate 410 is closed and the signal to have the read out counter proceed should be stopped.

The idle signal generating circuit 42 and the initial set circuit 47 can be readily arranged with the logic circuit and the coincidence detecting circuit 43 and the comparator 46 can be arranged with the operation circuit by a well-known technology.

According to this system, because of the incorporation of the buffer memory, the transmission delay time may be increased, and so an echo suppressor may become necessary in some particular case. In such cases, part of the bits in envelopes is used to send out the signal level at the transmitting point to the receiving point. Then detection of the signal level at the receiving point becomes unnecessary. Thus, an echo suppressing function can be easily incorporated in this system.

When this system is applied to data transmission along with telephone communication, it will be very effective if high priority is given to the envelopes of data transmission at the transmitting queue, giving higher, but tolerable possibilities of overflow to telephone communications.

As explained in detail so far, this invention has both the effective utilization of lines, and real time transparent characteristic of conversation. It is a communication exchange system integrating exchange and transmission. It is most appropriate for long distance or international communications where transmission cost is relatively high.

From the foregoing it will now be apparent that a new and improved communication exchange system has been found. It should be understood of course that the embodiments disclosed are merely illustrative and are not intended to limit the scope of the invention. Reference should be made to the appended claims therefore rather than the specification as indicating the scope of the invention.

What is claimed is:

1. A communication exchange system comprising:
   (a) input means including a plurality of input lines for receiving digital data, said digital data being formed in a plurality of signal blocks, each signal block having a predetermined number of bits and a designation corresponding to one of said plurality of input lines;
   (b) first scanning means for sequentially scanning said input lines;
   (c) priority decision means, coupled to said first scanning means, for determining if said signal blocks are significant and for deleting insignificant signal blocks;
   (d) first buffer means, coupled to said priority decision means, for storing only said significant signal blocks in a queue;
   (e) transmission line means having one end coupled to said first buffer means;
   (f) second buffer means coupled to the other end of said transmission line means for receiving the queue of significant signal blocks;
   (g) distribution circuit means coupled to said second buffer means;
   (h) idler means coupled to said distribution circuit means for inserting into the queue of signal blocks idle signals corresponding to said insignificant signal blocks;
   (i) second scanning means coupled to said distribution circuit means; and
   (j) output means coupled to said second scanning means, said distribution circuit means distributing said signal blocks to said output means through said second scanning means in accordance with the designation in said signal blocks.

2. The system of claim 1 wherein the capacity of said second buffer means is equal to or greater than the capacity of said first buffer means.

3. The system of claim 1 wherein said signal blocks include information indicative of the poower levels of the signals being transmitted.

4. The system of claim 1 wherein each signal block includes 512 data bits and channel identification bits.

5. The system of claim 1 wherein said priority decision means ranks said signal blocks in accordance with the significance thereof, the least significant signal blocks overflowing said first buffer means when said first buffer means becomes full.

6. The system of claim 1 wherein the first signal block after a vacancy in said transmission line means synchronizes said first and second scanning means.

* * * * *